United States Patent [19]

Hansen et al.

[11] Patent Number: 5,079,945
[45] Date of Patent: Jan. 14, 1992

[54] CRANKSHAFT DIRECTION OF ROTATION DETECTING APPARATUS

[75] Inventors: Mark C. Hansen, Ann Arbor, Mich.; Richard J. Jakupco; Michael L. Whitethorn, both of Kokomo, Ind.

[73] Assignee: Delco Electronics Corporation, Kokomo, Ind.

[21] Appl. No.: 645,067

[22] Filed: Jan. 23, 1991

[51] Int. Cl.$^5$ ............................................ G01M 15/00
[52] U.S. Cl. ........................................ 73/116; 123/617
[58] Field of Search ............... 73/117.3, 116; 123/643, 123/612, 617, 621, 613

[56] References Cited

U.S. PATENT DOCUMENTS

| Re. 30,928 | 5/1982 | Fuzzell et al. | 123/333 |
| 3,815,531 | 6/1974 | Wurst et al. | 112/220 |
| 4,086,894 | 5/1978 | Capurka et al. | 123/148 S |
| 4,365,602 | 12/1982 | Stiller et al. | 123/414 |
| 4,373,486 | 2/1983 | Nichols et al. | 123/414 |
| 4,508,092 | 4/1985 | Riess et al. | 123/613 X |
| 4,558,591 | 12/1985 | Francis et al. | 73/116 |
| 4,656,993 | 4/1987 | Yuzawa et al. | 123/643 |
| 4,690,124 | 9/1987 | Higashiyama | 123/643 |
| 4,854,284 | 8/1989 | Hara et al. | 123/617 X |

Primary Examiner—Jerry W. Myracle
Attorney, Agent, or Firm—Creighton R. Meland

[57] ABSTRACT

Apparatus for detecting the direction of rotation of a crankshaft of an internal combustion engine. The crankshaft drives wheels associated with sensors for developing two pulse trains as the crankshaft rotates. One pulse train is a square wave having consecutively occurring high and low periods of equal angular duration. The other pulse train is a square wave having a plurality of spaced window pulses of unequal angular duration. The relative high and low logic states of the pulse trains at certain window locations has one relationship for forward movement of the crankshaft and a different relationship for reverse movement of the crankshaft. These relationships are detected. At one of the window locations, the relative high and low logic states of the pulse trains is the same for either forward or reverse rotation. Engine reversal at this location is detected by detecting the occurrence of two consecutively occurring relative logic states that are the same.

5 Claims, 4 Drawing Sheets

CRANKSHAFT DIRECTION OF ROTATION DETECTING APPARATUS

This invention relates to apparatus for detecting the direction of rotation of a crankshaft of an internal combustion engine and, more particularly, to an apparatus that is capable of developing a signal that can disable a distributorless ignition system for the engine when the crankshaft is rotating in the reverse direction.

Apparatus for preventing an internal combustion engine distributorless ignition system from supplying spark firing energy to the spark plugs when the engine crankshaft is rotating in a reverse direction is known, one example being the apparatus disclosed in the U.S. Pat. No. 4,086,894 to Capurka et al.

This invention is concerned with detecting reverse rotation of the engine crankshaft in a system which includes apparatus for developing first and second pulse trains during rotation of the crankshaft. The first pulse train is comprised of a series of equally spaced pulses that are produced for each revolution of the engine crankshaft. For a six-cylinder engine, eighteen pulses can be produced for each revolution of the crankshaft. The second pulse train is comprised of pulses that only occur at certain angular positions of the crankshaft. The second pulses define windows of varying angular width and by counting the number of transitions or edges of the first pulse train that occur during a window of the second pulse train, an ignition coil of a distributorless ignition system can be enabled or selected that corresponds to a predetermined position of the crankshaft.

It, accordingly, is an object of this invention to provide a crankshaft direction of rotation detecting apparatus that is capable of detecting reverse rotation of the engine crankshaft from the crankshaft position information provided by the previously described first and second pulse trains.

Figure 1:
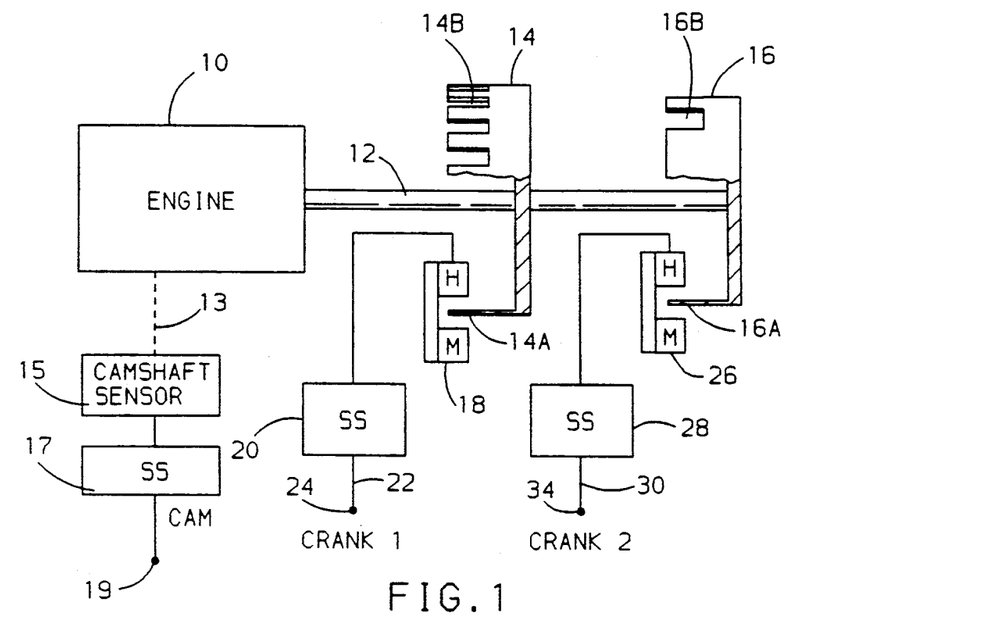
FIG. 1 illustrates engine crankshaft position detecting apparatus for developing two pulse trains related to engine crankshaft position.

Referring now to the drawings, and more particularly to FIG. 1, the reference numeral 10 designates a spark ignited internal combustion engine which for purposes of explanation of this invention is a six-cylinder engine. The engine 10 has a crankshaft 12 which drives two wheels 14 and 16 that are formed of magnetic material such as steel.

The wheel 14 has an annular rim 14A which rotates through a gap in a fixed Hall effect sensor 18. This sensor has a Hall effect device H and a permanent magnet M that are aligned with each other. The rim 14A has eighteen slots and eighteen teeth. The slots are designated as 14B and some of the eighteen slots are shown in FIG. 1. Each slot and tooth is about ten angular degrees wide. As the crankshaft 12 rotates, the rim 14A rotates between the Hall effect device and magnet to alternately allow flux developed by the magnet to intercept the Hall effect device or be shunted away from the Hall effect device.

Figure 3:
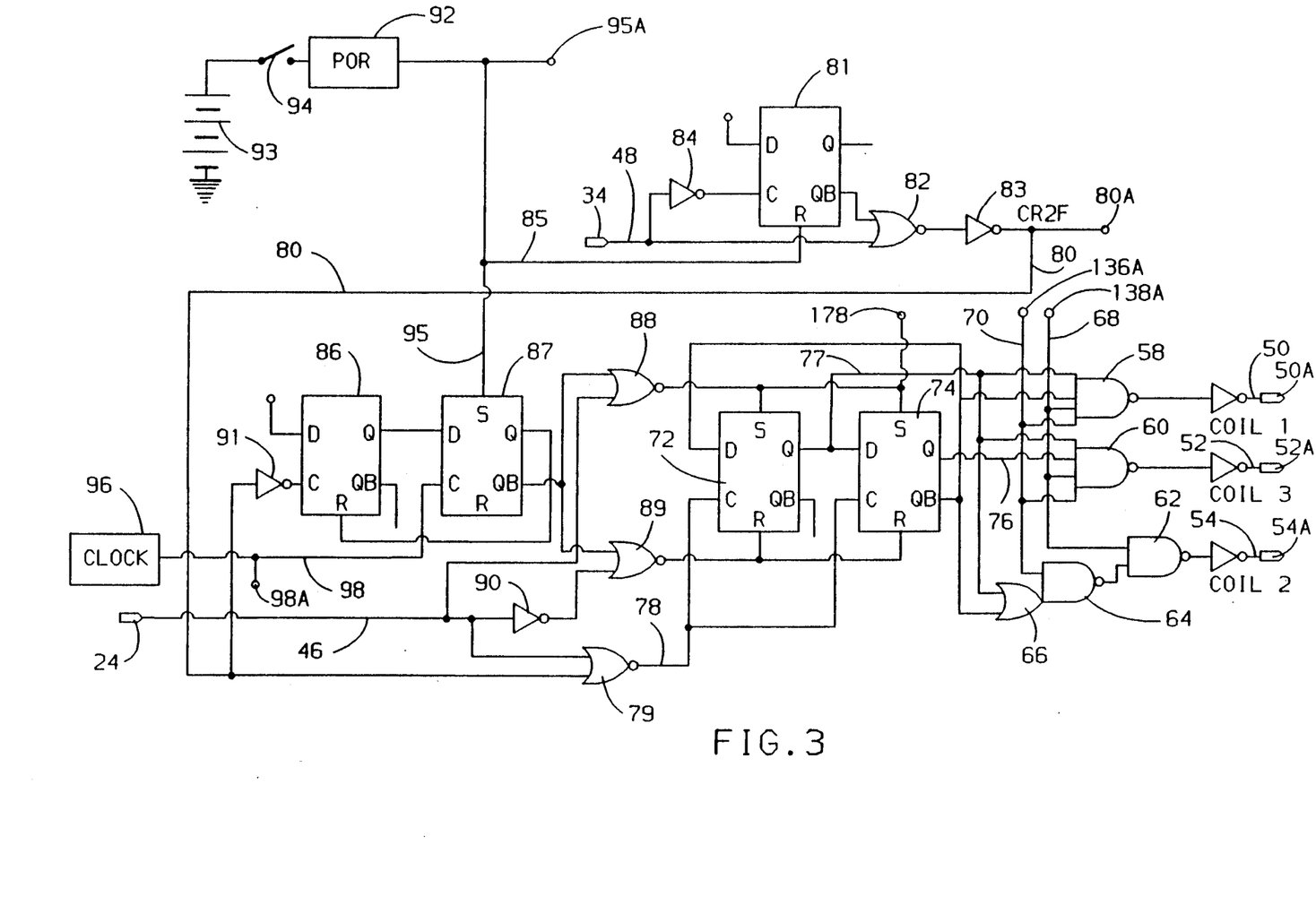
FIG. 3 illustrates a digital logic circuit for identifying engine crankshaft positions from the pulse trains shown in FIG. 2.

The Hall effect device H of sensor 18 is connected to a signal shaping circuit 20 which, in turn, is connected to an output conductor 22. Conductor 22 is connected to a junction 24. Junction 24 is also illustrated in FIG. 3.

Figure 2:
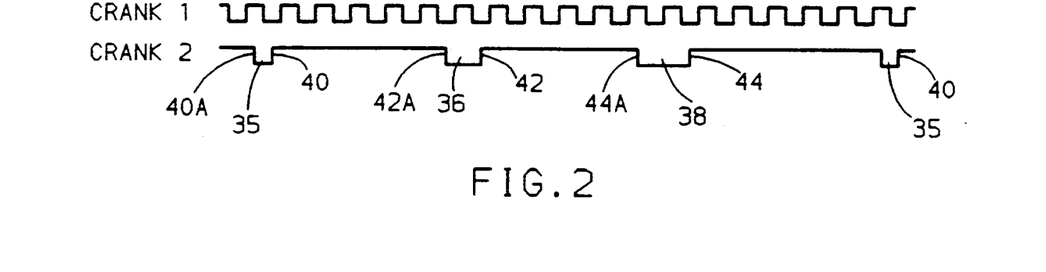
FIG. 2 illustrates the pulse trains developed by the apparatus shown in FIG. 1 as a function of crankshaft angular position.

The pulse waveform that is developed on line 22 as crankshaft 12 rotates is shown in FIG. 2, where it is identified as CRANK 1. This waveform goes alternately high and low for rotation angles of the crankshaft of ten degrees. Thus, during one revolution of crankshaft 12, there will be eighteen alternately occurring high and low periods which are each ten degrees wide.

The other wheel 16 is associated with another Hall effect sensor 26 having a Hall effect device H and a permanent magnet M. The annular rim 16A of wheel 16 rotates through the gap between the Hall effect device H and magnet M. Rim 16 has three angularly spaced slots 16B only one of which is illustrated in FIG. 1. The remainder of the rim is solid. The three slots are respectfully ten, twenty and thirty degrees wide.

The Hall effect device H of sensor 26 is connected to signal shaping circuit 28 which has an output connected to line 30. Line 30 is connected to junction 34 which is also illustrated in FIG. 3.

The pulse train due to rotation of wheel 16 that is developed as crankshaft 12 rotates is shown in FIG. 2 and identified as CRANK 2. This pulse train has three angularly spaced low periods 35, 36 and 38. Period 35 is ten angular degrees wide and periods 36 and 38 are respectively twenty and thirty degrees wide. These low periods occur when a corresponding slot in rim 16A is between the Hall effect sensor and the magnet. The edge transitions 40, 42 and 44 occur respectively at 75 degrees before top dead center of a given cylinder pair. It can be seen that the transitions of CRANK 2 always occurs five degrees after (or one half way between) the transitions of CRANK 1.

The engine 10 has a camshaft 13 which is shown as a dotted line. Camshaft 13 drives a camshaft position sensor 15. Sensor 15 may comprise a permanent magnet that is rotatably driven by camshaft 13 and which swings past a Hall effect device in a certain angular position of the camshaft. The Hall effect device is connected to a signal shaping circuit 17 which develops an output waveform at junction 19 which is called CAM. This CAM signal is normally high and goes low for a predetermined small amount of angular rotation of camshaft 13 at a predetermined angular position of camshaft 13. The CAM signal goes low once every two revolutions of the crankshaft 12. This angular position may be, for example, at about ninety-five degrees before top dead center of a cylinder pair. The CAM signal goes low at the same place CRANK 2 has its twenty degree window 36. Junction 19 is shown in other figures of the drawings, it being understood that junctions identified as 19 are electrically connected by conductors that are not illustrated.

Referring now to FIG. 3, a synchronous digital logic circuit is illustrated that identifies an ignition coil to be enabled as a function of crankshaft angular position from the CRANK 1 and CRANK 2 waveforms. In FIG. 3, junctions 24 and 32 (also shown in FIG. 1) are illustrated connected respectively to lines 46 and 48. Accordingly, line 46 has the CRANK 1 waveform applied thereto and line 48 has the CRANK 2 waveform applied thereto.

The output of the circuit shown in FIG. 3 is comprised of lines 50, 52 and 54 also identified as COIL 1, COIL 3 and COIL 2. Each of these lines is connected to known apparatus that controls energization of the primary winding of one ignition coil. Thus, in a six-cylinder engine, there are three ignition coils for one each cylinder pair. The lines 50-54 selectively enable energization of only one ignition coil at a time.

Line 50 is connected to the output of a NAND gate 58 through an inverter. Line 52 is connected to the output of NAND gate 60 through an inverter. Line 54 is connected to the output of NAND gate 62 through an inverter. One input of NAND gate 62 is from NAND gate 64. One input to NAND gate 64 is from OR gate 66.

One of the inputs of NAND gates 58, 60 and 62 are connected respectively to a conductor or line 68. Conductor 70 is connected respectively to inputs of NAND gates 58, 60 and 64.

The logic circuitry of FIG. 3 has two D-type flip-flops 72 and 74. The Q output of flip-flop 74 is connected to line 76 which, in turn, is connected to an input of NAND gate 60. The Q output of flip-flop 72 is connected to the D input of flip-flop 74 and to a line 77. Line 77 is connected to an input of NAND gate 58, NAND gate 60 and NOR gate 66.

The clock input C of flip-flop 74 and flip-flop 72 are both connected to a line 78. Line 78 is connected to the output of a NOR gate 79. One input to NOR gate 79 is the CRANK 1 signal from line 46. The other input of gate 79 is connected to a line 80.

The signal on line 80 is developed by a circuit comprised of D-type flip-flop 81, NOR gate 82, and inverters 83 and 84. A power-on reset line 85 is connected to the R input of flip-flop 81. The CRANK 2 signal on line 48 is connected to inverter 84 and to one input of gate 82. The inverter 84 is connected to the clock input C of flip-flop 81. The QB output of flip-flop 81 is connected to one input of gate 82. The output of gate 82 is connected to inverter 83 and it, in turn, is connected to line 80.

The FIG. 3 logic circuit has two D-type flip-flops 86 and 87. The QB output of flip-flop 87 is connected to inputs of NOR gates 88 and 89. The output of NOR gate 89 is connected to the reset terminals R of flip-flops 72 and 74. The output of gate 88 is connected to the set terminals S of flip-flops 72 and 74. The line 46 is connected to an input of gate 88 and to an input of gate 89 through inverter 90. Line 46 is also connected to an input of gate 88. The Q output of flip-flop 87 is connected to the R terminal of flip-flop 86.

The line 80 connected to the clock input C of flip-flop 86 via inverter 91.

The circuit of FIG. 3 has a power-on reset circuit 92 connected to the battery 93 on the vehicle through ignition switch 94. POR circuit 92 is connected to lines 85 and 95. Line 95 is connected to the set terminal S of flip-flop 87. The logic circuit of FIG. 3 is energized from battery 93 by circuitry (not illustrated) when switch 94 is closed. Thus, the FIG. 3 circuit is powered-up when switch 94 is closed and at power-up flip-flop 81 is reset as explained in more detail hereinafter.

The circuit of FIG. 3 has a clock pulse source 96 that is connected to the clock terminal C of flip-flop 87 by line 98. The frequency of the clock pulses developed by clock pulse source 96 may be about 125 KHz. Clock 96 is the system clock.

The logic circuit of FIG. 3 counts the edges of the CRANK 1 signal while the CRANK 2 signal is low. It can be seen from FIG. 2 that if power-up occurs when the CRANK 2 signal is low, one could not properly count the edges of the CRANK 1 signal before the rise of CRANK 2. For example, with the thirty degree pulse 38, the circuit might see one, two or three edges, depending on where the power-up started. The circuit comprised of flip-flop 81, gate 82 and inverters 83 and 84 protects against the type of improper operation that has been described. The operation of the FIG. 3 circuit will now be described.

On power-up, (closure of ignition switch 94) flip-flop 81 is reset. This brings the QB output of flip-flop 81 high, so that the signal on line 80 is forced high. Only when a falling edge of CRANK 2 is seen, does the rising edge of the output of inverter 84 cause the flip-flop 81 to clock high. This brings QB low, releasing the signal on line 80 to follow the CRANK 2 signal on line 48. Until another power-up, the signal on line 80 will exactly follow the signal on line 48. This logic guarantees that on a power-up, no edge counting of the CRANK 1 signal will occur until a valid falling edge of CRANK 2 starts the event. The signal on line 80 is the signal that represents CRANK 2 for all the following logic. This signal on line 80 will be referred to hereinafter as CR2F.

Every time CR2F falls, the flip-flop 86 will be clocked to a high state (Q=1). The output of clock 96 will then clock this 1 into flip-flop 87. This will cause the Q output 87 to go high, which then resets the output of 87 (Q=0). The next rising edge of the clock signal from clock 96 will then clock this 0 into the flip-flop 87, bringing the Q output of 87 back low. This takes the reset of 86 low, which allows the next falling edge of CR2F to start the sequence over again.

The flip-flops 72 and 74 form a counter. The flip-flops 86 and 87 form a synchronous one-shot that pulses every time the CR2F falls. The one one-shot presets the 72-74 counter for proper counting. It is pointed out that the QB output of 87 is applied to NOR gates 88 and 89. When QB of 87 goes low, either the output of gate 88 or 89 will go high, depending on whether CRANK 1 is low or high. If CRANK 1 is high, the output of 89 will go high and counter 72-74 will be reset to a 0,0 count. This 0,0 count means that lines 77 and 76 connected to counter 72-74 are both at 0 logic levels. If CRANK 1 is low, the output of gate 88 will go high and counter 72-74 will be set to a 1,1 count. Since CRANK 2 falls five degrees after a CRANK 1 transition, the one-shot event is guaranteed to occur when CRANK 1 is at a steady state condition.

The signal on line 78 (output of 79) is the clock for the 72-74 counter. All rising edges of the signal on line 78 will advance the counter 72-74 to its next state. While CR2F is high, the signal on line 78 is held low, so no counting can occur. While CR2F is low, every falling edge of CRANK 1 will cause the signal on line 78 to rise advancing the counter one count. The counter 72-74 is connected in a modulo four configuration and thus the counter advances through the states 0,0 to 1,0 to 1,1 to 0,1 to 0,0 etc.

The detection of the ten degree period or waveform 35 will now be described. When CRANK 2 falls, CRANK 1 is high. Therefore, the one-shot (86-87) will reset the counter 72-74 through gate 89 to a 0,0 state. While CR2F is low, there is only one falling edge of the CRANK 1 waveform. This will advance counter 72-74 from 0,0 to 1,0. CRANK 2 will then rise, disabling future CRANK 1 clock pulses. The final state of the counter for the ten degree period 35 is 1,0.

The detection of the twenty degree period or waveform 36 will now be described. When CRANK 2 falls, CRANK 1 is low. Therefore, the one-shot (86–87) will set the counter 72–74 through gate 88, to a 1,1 state. While CR2F is low, there is again only one falling edge of CRANK 1. This will advance the counter from 1,1 to 0,1. CRANK 2 will then rise, disabling future CRANK 1 clock pulses. It is noted that there is an extra rising edge at the output of gate 79 when CR2F falls. The first rising edge actually advances counter 72–74 one count. Since the one-shot (86–87) then presets the counter 72–74 to a 1,1 state, this extra clock does not matter. The falling edge of CRANK 1 then advances the count to the proper state. The final counter state for the twenty degree period 36 is 0,1.

The detection of the thirty degree period or waveform 38 will now be described. When CRANK 2 falls, CRANK 1 is high. Therefore, the one-shot 86–87 will reset the counter 72–74 through gate 89 to a 0,0 state. While CR2F is low there are two CRANK 1 falling edges. This will advance counter 72–74 from 0,0 to 1,0 to 1,1. CRANK 2 will then rise, disabling future CRANK 1 clock pulses. The final counter state for the thirty degree period is 1,1.

The system that has been described is used with apparatus for detecting the proper direction of rotation of crankshaft 12 and wheels 14 and 16. This apparatus, which is described hereinafter, applies a SYNC signal to line 68 allowing gates 58–62 to energize the coils when the direction of rotation of crankshaft 12 is proper. If crankshaft rotation is not proper, the counter state of counter 72–74 will never be used.

The use of line 70 is optional. It is assumed in the further description of this invention that line 70 is used. Line 70 has a CAMHIGH signal applied thereto. This CAMHIGH signal can be used as a back-up in case the CRANK 2 signal is lost. The CAMHIGH signal is developed by the circuit of FIG. 4.

The CAMHIGH signal will go low at about seventy degrees BTDC and a SYNC pulse will then occur, in a manner to be described, if the direction of the engine rotation is correct. This SYNC pulse is applied to line 68. CAMHIGH in the low state will keep COIL 1 and COIL 3 low and will cause the output of gate 64 to go high, enabling the SYNC signal on line 68 to bring COIL 2 high. At all other times, the CAMHIGH signal is high and a SYNC pulse gates whichever state is seen on counter 72–74.

If proper wheel rotation is detected, the SYNC signal will be developed at seventy degrees BTDC. The output of gate 58 will go low when the Q output of 72, the QB output of 74, SYNC and CAMHIGH are all high. This represents a ten degree 1,0 state. The output of gate 60 will go low when the Q output of 72, Q output of 74, SYNC and CAMHIGH are all high. This represents a thirty degree or 1,1 state. The output of gate 62 will go low when the Q output of 72 and the QB output of 74 are both low, and SYNC and CAMHIGH are high. This represents a twenty degree 0,1 state.

In FIG. 1, Hall effect sensors have been disclosed for developing, in conjunction with slotted wheels 14 and 16, the CRANK 1 and CRANK 2 pulse trains. The crankshaft sensing arrangement could be of the type disclosed, for example, in the U.S. Pat. No. 4,508,092, to Kiess et al, where a sensor uses one permanent magnet and two Hall effect devices. Moreover, sensors other than Hall effect devices could be used to produce the CRANK 1 and CRANK 2 pulse trains.

The flip-flop 81 is a memory element, since it can store binary information.

The digital logic circuitry of FIGS. 4 and 5 will now be described. In the drawings, various terminals or junctions have been shown and identified by reference numerals. It is to be understood that terminals that have the same reference numeral in the various figures of the drawings are electrically connected together by conductors which have not been illustrated.

Figure 4:
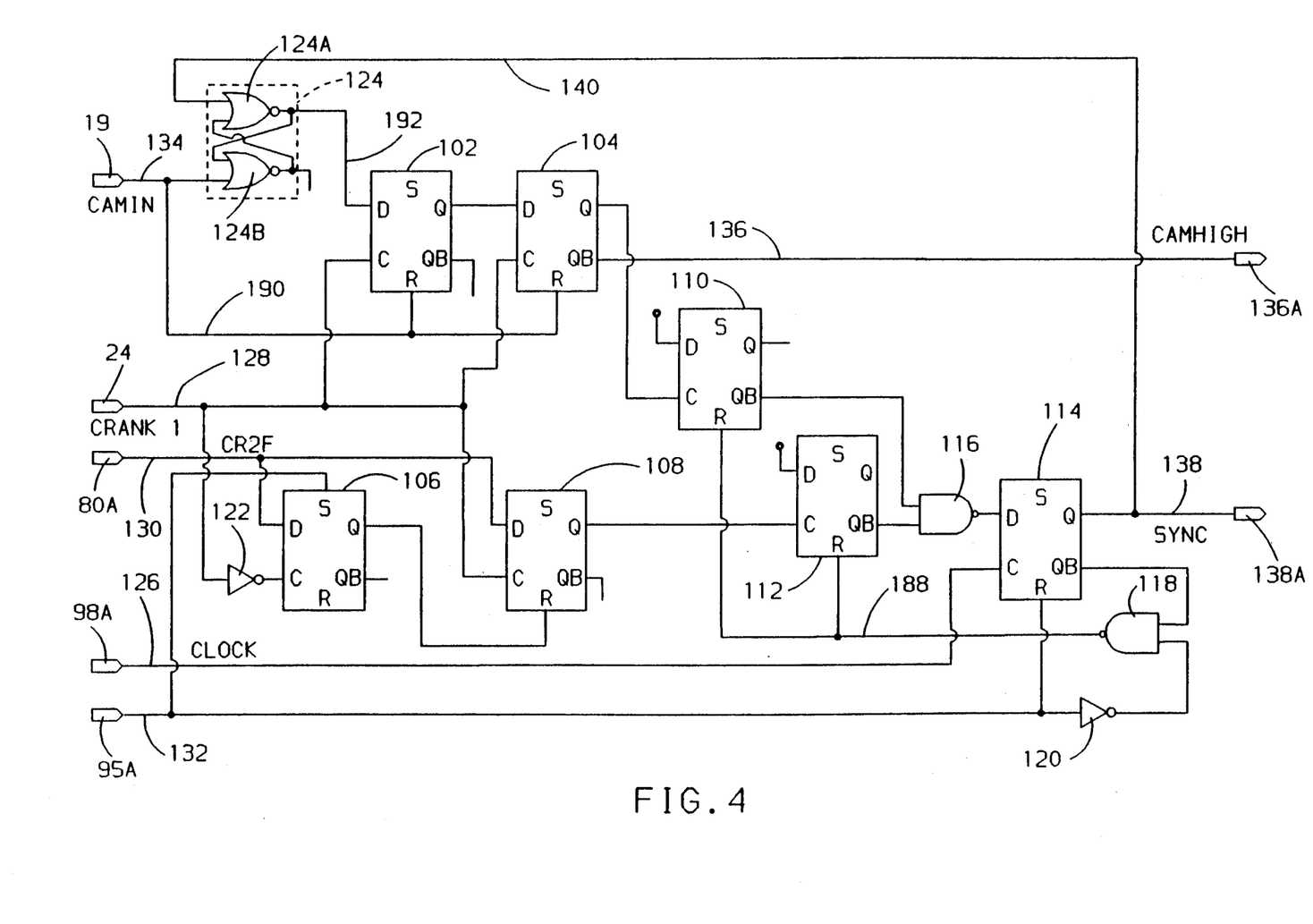
FIGS. 4 and 5 illustrate digital logic circuitry that are utilized in the system of this invention.

The logic circuit of FIG. 4 comprises D-type flip-flops 102, 104, 106, 108, 110, 112 and 114. This circuit further comprises NAND gates 116 and 118 and inverters 120 and 122. The circuit also has a latch 124 comprised of two NOR gates 124A and 124B connected as shown.

The various input and output lines for the circuit of FIG. 4 are now described. Line 126 is connected to terminal 98A (also shown in FIG. 3) and accordingly is connected to clock 96. The CRANK 1 signal is applied to input line 128 and the CR2F signal is applied to line 130. Line 130 is connected to junction 80A also shown in FIG. 3. Line 132 is a power-on reset line and is connected to terminal 95A which is also shown in FIG. 3. Line 134 has the CAM signal applied, thereto since it is connected to junction 19 shown in FIG. 1. Line 136, is connected to the QB output of flip-flop 104 and the previously mentioned CAMHIGH signal is developed and applied to this line. Line 136 is connected to terminal or junction 136A which is also shown in FIG. 3. Accordingly, CAMHIGH is applied to line 70 of FIG. 3. The Q output of flip-flop 114 is connected to line 138 and to latch 124 via lines 138 and 140. The previously described SYNC signal is developed on line 138. Line 138 is connected to terminal 138A also shown in FIG. 3. Accordingly, the SYNC signal is applied to line 68.

Figure 5:
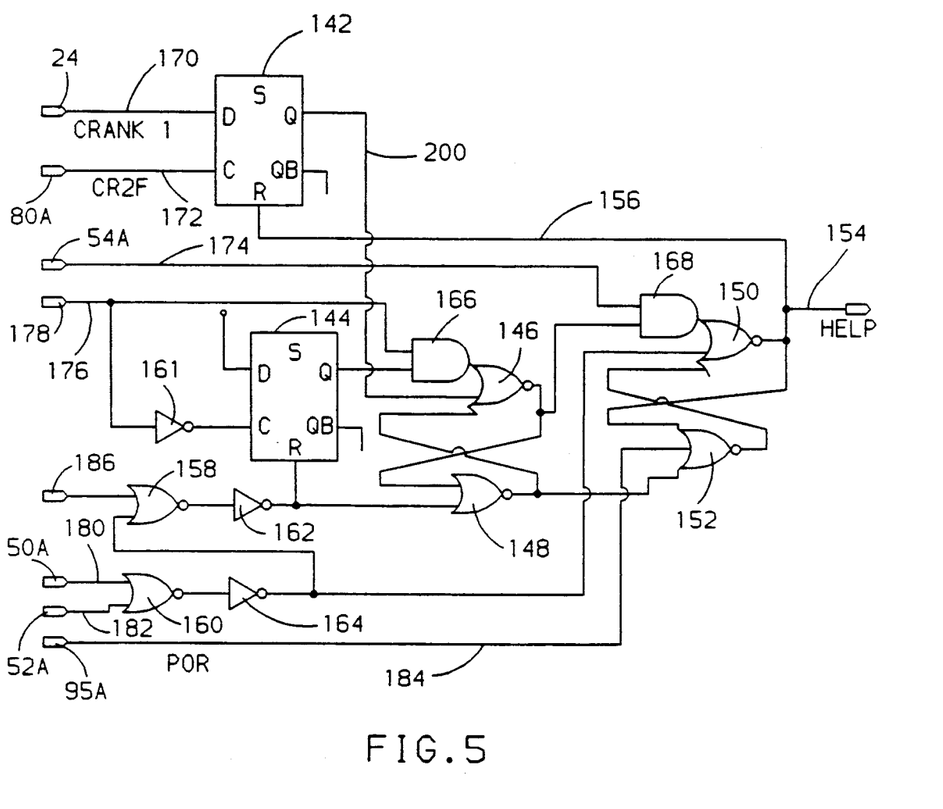

FIG. 5 illustrates a digital logic circuit for developing a so-called HELP signal. The purpose of this signal will be described hereinafter.

The circuit of FIG. 5 has D-type flip-flops 142 and 144. It further has a so called reverse latch REV comprised of NOR gates 146 and 148 connected as shown. The circuit also has a so-called HELP latch comprised of NOR gates 150 and 152 that is connected to lines 154 and 156. Line 156 is connected to the reset terminal R of flip-flop 142. A HELP signal is developed on line 154.

The logic circuit of FIG. 5 has NOR gates 158 and 160 and inverters 161, 162 and 164. This circuit further has AND gates 166 and 168.

The various input lines to the circuit of FIG. 5 will now be described. Line 170 is connected to terminal 24 and therefore has the CRANK 1 signal applied thereto. Line 172 is connected to junction 80A and therefore has the CR2F signal applied thereto. The line 174 is connected to a terminal 54A which is also shown in FIG. 3 connected to line 54 that controls COIL 2. Line 176 is connected to a terminal 178 also shown in FIG. 3 as connected to the output of NOR gate 88. Line 176 is connected to one side of inverter 161, the opposite side of this inverter being connected to the clock terminal C of flip-flop 144. Line 180 is connected to one input of NOR gate 160 and to a terminal 50A which is also shown in FIG. 3. The COIL 1 signal on line 50 is therefore applied to line 180. Line 182 is connected to the other input of NOR gate 160. This line is connected to terminal 52A which is also shown in FIG. 3. Therefore, the COIL 3 signal on line 52 is applied to line 182. Line 184 is a power-on reset line and it is connected to terminal 95A which is also shown in FIG. 3.

The line 186 is another power-on reset line which has a signal applied thereto by circuitry (not illustrated) that is similar to the power-on reset signal applied to line 184.

The operation of the logic circuitry shown in FIGS. 4 and 5 will now be described. The system initially powers-up in a state called HELP. The system will remain in this state until proper engine synchronization is achieved. While in this state, the system does not know which ignition coil to energize, so no ignition coils are activated. In this so-called HELP state, the state of the signal on line 154 can be used to maintain all the driver transistors connected respectively to the primary windings of the ignition coils in a non-conductive state.

To leave the just described HELP state, that is, to change the state of the signal on line 154, certain steps must occur. Before describing these steps, and referring to the waveforms of FIG. 2, it is pointed out that during the proper direction of rotation of crankshaft 12 pulse edges 40, 42 and 44 rise (low to high transition) and pulse edges 40A, 42A and 44A fall (high to low transition). During reverse rotation of crankshaft 12, pulse edges 40, 42 and 44 fall and edges 40A, 42A and 44A rise. During the proper direction of rotation of crankshaft 12, pulse edges 40, 42 and 44 of the CRANK 2 signal always rise when the CRANK 1 signal is low. If the direction of rotation of crankshaft 12 reverses, (improper direction), the CRANK 2 signal will have a rising edge 40A at the ten degree location 35 and a rising edge 44A at the thirty degree location 38 that respectively occur when CRANK 1 is high. This difference can be detected. With the twenty degree window 36, however, pulse edges 42A or 42 of CRANK 2 rise when CRANK 1 is low in either direction of rotation of crankshaft 12. Therefore, more information is needed to detect engine reversal at the twenty degree location. The following description will explain how the system detects engine reversal in either case.

The sequence of steps that must occur that is applicable to the logic states associated with the ten and thirty degree window pulses 35 and 38, to leave the previously described HELP state are as follows:

1. CRANK 1 must fall when CRANK 2 is low; then
2. CRANK 2 must rise when CRANK 1 is low; then
3. CRANK 1 must rise when CRANK 2 is high.

If these three events occur, in the sequence described, a SYNC pulse will be developed on line 138 (FIG. 4) that is applied to line 68 (FIG. 3) to gate the preset logic of FIG. 3 that is connected to line 68.

A SYNC pulse will be developed on line 138 whenever the output of NAND gate 116 can go high. If the output of gate 116 goes high, the system clock 96, which is connected to line 126, will clock this high state into flip-flop 114, bringing the SYNC signal on line 138 high. When the SYNC signal goes high, the QB output of flip-flop 114 will go low, the output of gate 118 will go high and flip-flops 110 and 112 will be reset via line 188 that connects the output of gate 118 to the reset terminals R of these flip-flops. This will force the output of gate 116 low and the next rising edge of the clock signal on line 126 will bring the SYNC signal on line 138 low again.

The output of gate 116 will rise whenever the QB output of flip-flop 112 or 110 are clocked high. On a power-up of the system, the signal on line 132 will reset flip-flops 110 and 112 via line 132, inverter 120 and gate 118. The proper sequence of CRANK 1 and CRANK 2 transitions, as described above, will clock the QB output of flip-flop 112 high. Two CRANK 1 rising edges, after the fall of CAMIN, will cause the QB output of flip-flop 110 to clock high.

The flip-flop 112 is clocked by the Q output of flip-flop 108 since the Q output of flip-flop 108 is connected to the clock input C of flip-flop 112. To get flip-flop 108 to toggle high, its reset R must first go low. To get this reset low, the Q output of flip-flop 106 must be clocked low. On a power-up of the system, the Q output of flip-flop 106 is set to a high state, which holds the flip-flop 108 in a reset state. After the POR signal on line 132 is low, every falling edge of CRANK 1 will clock the level of CRANK 2 into flip-flop 106. If the Q output of flip-flop 106 is low, every rising edge of CRANK 1 will clock the level of CRANK 2 into flip-flop 108. To get a rising edge on the flip-flop 112, the following must occur: CRANK 1 must fall when CRANK 2 is low to clock the Q output of flip-flop 106 low; CRANK 2 must then rise; and then CRANK 1 must rise while CRANK 2 is high. The next falling edge of CRANK 1 will clock the high level of CRANK 2 into flip-flop 106, resetting flip-flop 108.

Flip-flop 110 is clocked by flip-flop 104. The CAMIN signal on line 134 is applied to the reset terminals R of flip-flops 102 and 104 via line 190. This signal keeps the flip-flops 102 and 104 low. A high level on line 134 (CAMIN) resets the latch 124 so that output of the latch on line 192 is high. When CAMIN (line 134) goes low, two rising edges of CRANK 1 will clock the high level on line 192 through to flip-flop 104. The rising edge of the Q output of flip-flop 104 will toggle flip-flop 110 high. The CAMIN signal (line 134) goes low at about ninety degrees BTDC of a given cylinder pair. The latch 124 is needed only in the event the CAMIN signal is lost. The SYNC signal on line 140 sets the latch 124, bringing line 192 low. Then forty degrees after the SYNC pulse occurs, the CAMHIGH signal (line 136) will go high. If the CAMIN signal fails in the low level, the latch 124 will assure that the CAMHIGH signal cannot disable the normal presetting of the ten and thirty degree CRANK 2 pulses.

As previously described, the HELP state is entered during power-up of the system. The logic circuit shown in FIG. 5 operates to leave and enter the HELP state. On system power-up HELP on line 154 goes high and the REV latch, comprised of gates 146 and 148, is reset. Further reference to the REV latch being reset means that the output of gate 148 will go low and the output of gate 146 will go high. Further reference to the REV latch being set means that the output of gate 148 will go high and the output of gate 146 will go low.

HELP (line 154) can go low if any of the COIL signals at terminals 50A, 52A or 54A go high. This will happen whenever a SYNC pulse occurs and a valid CRANK 2 pulse width is decoded. The COIL 1 signal (terminal 50A) and COIL 3 signal (terminal 52A) go into the NOR gate 160 which feeds inverter 164. This inverter, if it goes high, will bring HELP low. The COIL 2 signal (terminal 54A) can also bring HELP low if the reverse latch REV, comprised of NOR gates 146 and 148, is not set. The REV latch, if set, keeps the system in HELP and disables the twenty degree COIL 2 pulse from resetting the HELP latch that is comprised of gates 150 and 152.

The REV latch (gates 146 and 148) can be set in two ways. It will be set if a rising edge of CRANK 2 occurs when CRANK 1 is high. This can only happen if the engine has reversed at the ten or the thirty degree locations. Also, the REV latch will be set if two pulses occur in a row on line 176. These pulses will hereinafter be referred to as BPN pulses. The BPN pulses on line 176 are developed by the output of NOR gate 88 (FIG. 3). A BPN pulse occurs during forward rotation of crankshaft 12 when CRANK 2 falls when CRANK 1 is low and should only happen once per revolution of the crankshaft at the twenty degree location, as is evident from an inspection of FIG. 2. If two BPN pulses occur in a row, then the engine has reversed just after the twenty degree location. Thus, during forward rotation of crankshaft 12, a first BPN pulse can occur when CRANK 2 falls (42A) and CRANK 1 is low. If engine reversal now immediately occurs, another BPN pulse is developed by the now falling edge 42 of CRANK 2 while CRANK 1 is low.

The externally driven PORIN signal applied to line 186 will guarantee that on a power-up of the system, the REV latch will be reset. Flip-flop 142 will toggle high whenever a rising edge of CRANK 2 occurs when CRANK 1 is high. Flip-flop 142 then sets the REV latch via line 200. Flip-flop 144 will toggle high whenever a falling edge of CRANK 2 occurs when CRANK 1 is low. This will normally happen at the twenty degree window. Normally, the COIL 3 signal (terminal 52A) will reset flip-flop 144 before a BPN pulse can occur again. If engine reversal occurs just after the twenty-degree location however, CRANK 2 will fall when CRANK 1 is low and a BPN pulse will be developed. Since flip-flop 144 would still be set, the 1,1 combination on the inputs of gate 166 from BPN and flip-flop 144 sets the REV latch causing HELP to go high.

Once the REV latch is set, only an external POR signal or a valid COIL 1 or COIL 3 signal can reset it. The COIL 2 pulse is disabled from resetting HELP while the REV latch is set, since the CRANK 2 waveform looks the same in either direction of engine rotation. COIL 2 pulses can still occur, but since the HELP signal is high, no coils are allowed to turn on. The SYNC logic will guarantee that ten and thirty degree pulses will only occur in the forward direction.

In regard to the operation of this invention, it is pointed out that engine reversal, also called rockback, can occur when the engine is being cranked by the cranking motor and cranking is terminated. Pressure inside an engine cylinder as a piston approaches top dead center can cause the engine to be reversed when cranking is terminated.

In regard to detection of the direction of rotation of the crankshaft, the system accomplishes this with respect to the ten and thirty degree windows 35 and 38 by responding to the relative logic states (high or low) of the CRANK 1 and CRANK 2 signals. These relative logic states, as has been described, have a certain relative logic relationship for forward movement of the crankshaft and a different relative logic relationship for reverse movement of the crankshaft. However, as has been described, the relative logic relationship of the CRANK 1 and CRANK 2 signals is the same for either direction of crankshaft rotation with respect to the twenty degree window 36. This invention detects reversal at the twenty degree location 36 by the development of two consecutively occurring BPN pulses at output of NOR gate 88 (FIG. 3). To pursue this further, let it be assumed that the crankshaft 12 is rotated in the proper direction by being cranked by the engine cranking motor to cause pulse edge 42A to fall while CRANK 1 is low. This, as previously described, will cause of the development of one BPN pulse. If after the rising edge 42 on CRANK 2 occurs, the engine immediately reverses, a falling edge 42 will occur when CRANK 1 is low, which produces another BPN pulse. Accordingly, two consecutive occurrences of a falling edge of CRANK 2, while CRANK 1 was in a low state, has taken place. It can be appreciated that detection of engine crankshaft reversal at the twenty degree location 36 takes place when the crankshaft is first rotated in a forward direction and then subsequently in a reverse direction where the reverse direction of movement occurs prior to the development of window 38.

The embodiments of the invention in which an exclusive property or privilege is claimed are defined as follows:

1. Apparatus for providing electrical signals that are indicative of the direction of rotation of the crankshaft of an internal combustion engine, comprising in combination, an internal combustion engine having a crankshaft, means responsive to rotation of said crankshaft for developing first and second pulse trains, said first pulse train defined by a square wave having consecutively occurring high and low states, said second pulse train defined by a square wave having at least first and second spaced window pulses of different angular duration corresponding to predetermined angular positions of the crankshaft, each window pulse being defined by pulse edges and being in a low state for the duration of a window pulse, the phase relationship of said pulse trains being such that when said crankshaft is rotating in a first direction, a pulse edge of said first window pulse rises when said first pulse train is low and such that when said crankshaft is rotating in a second opposite direction a pulse edge of said first window pulse rises when said first pulse train is high, said phase relationship being such that the pulse edges of said second window pulse rise when said first pulse train is low when said crankshaft is rotating in either of said first or second directions, means responsive to said pulse trains for developing a signal of a predetermined logic state when a pulse edge of said first window pulse rises when said first pulse train is low and for changing the logic state of said signal when a pulse edge of said first window pulse rises when said first pulse train is high, and means responsive to said pulse trains for developing a signal of a predetermined logic state when there is two consecutive occurrences of a falling pulse edge of said second window pulse that occur respectively when said first pulse train is low.

2. The apparatus according to claim 1 where said first pulse train is developed continuously during one revolution of said crankshaft and where the consecutively occurring high and low states of said first pulse train are of equal durations that correspond to a predetermined amount of angular rotation of said crankshaft.

3. Apparatus for developing electrical signals that are indicative of the direction of rotation of the crankshaft of an internal combustion engine, comprising in combination, an internal combustion engine having a crankshaft, means responsive to rotation of said crankshaft for developing first and second pulse trains, said first pulse train defined by a square wave having consecutively occurring high and low states, said second pulse train defined by a square wave having at least first, second and third spaced window pulses of different angular duration that are each defined by pulse edges and each window pulse being in a low state for the duration of a window pulse, the phase relationship of said pulse trains being such that when said crankshaft is rotating in a first direction, a pulse edge of either of said first and third window pulses rises when said first pulse train is low and such that when said crankshaft is rotating in an opposite direction a pulse edge of either of said first and third window pulses rises when said first pulse train is high, said phase relationship being such that the pulse edges of said second window pulse rise when said first pulse train is low when said crankshaft is rotating in either of said first or second directions, means responsive to said pulse trains for developing a signal of predetermined logic state when a pulse edge of either of said first and third window pulses rises when said first pulse train is low and for changing the logic state of said signal when a pulse edge of either of said first and third window pulses rises when said first pulse train is high, and means responsive to said pulse trains for developing a signal of a predetermined logic state when there is two consecutive occurrences of a falling pulse edge of said second window pulse that respectively occur when said first pulse train is low.

4. The apparatus according to claim 3 where said first pulse train is developed continuously during one revolution of said crankshaft and where the consecutively occurring high and low states of said first pulse train are of equal durations that correspond to a predetermined amount of angular rotation of said crankshaft.

5. The apparatus according to claim 3 were the durations of said consecutively occurring high and low states of said first pulse train each correspond to ten degrees of angular rotation of said crankshaft and wherein the durations of said first, second and third window pulses correspond respectively to ten, twenty and thirty angular degrees of rotation of said crankshaft.

* * * * *